US006585886B1

(12) United States Patent
Luehr

(10) Patent No.: US 6,585,886 B1
(45) Date of Patent: Jul. 1, 2003

(54) AEROBIC MICROBIOLOGICAL WASTEWATER TREATMENT REACTOR

(76) Inventor: Wolfgang Luehr, Swinemuender Strasse 49, D-13355, Berlin (DE)

(*) Notice: Subject to any disclaimer, the term of this patent is extended or adjusted under 35 U.S.C. 154(b) by 0 days.

(21) Appl. No.: 09/869,496
(22) PCT Filed: Dec. 23, 1999
(86) PCT No.: PCT/EP99/10353
§ 371 (c)(1),
(2), (4) Date: Aug. 9, 2001
(87) PCT Pub. No.: WO00/39033
PCT Pub. Date: Jul. 6, 2000

(30) Foreign Application Priority Data

Dec. 29, 1998 (DE) .......................................... 198 60 942

(51) Int. Cl.[7] ............................. C02F 3/20; B01D 21/00
(52) U.S. Cl. ....................... 210/96.1; 210/151; 210/182; 210/188; 210/205; 210/209; 210/218; 210/90; 210/103; 210/108
(58) Field of Search ................................ 210/150, 151, 210/180, 181, 182, 184, 188, 209, 218, 620, 321.69, 96.2, 96.1, 90, 103, 108, 106, 205

(56) References Cited

U.S. PATENT DOCUMENTS 4,883,594 A 11/1989 Sekoulov et al.
6,132,602 A 10/2000 Luehr

FOREIGN PATENT DOCUMENTS

| DE | 34 44 383 A1 | 1/1987 |
| DE | 41 16 144 A1 | 12/1991 |
| DE | 196 21 156 A1 | 11/1997 |
| JP | 08 117776 | 5/1996 |
| WO | WO 91 19681 A1 | 12/1991 |
| WO | WO 95 06010 A1 | 3/1995 |

Primary Examiner—Joseph Drodge
Assistant Examiner—Terry K. Cecil
(74) Attorney, Agent, or Firm—Marshall & Melhorn, LLP

(57) ABSTRACT

A wastewater treatment reactor includes an upper chamber 4 biomass therein and a lower chamber including a combination filtering/aerating unit 6 having a gas inlet 9 and a discharge outlet 10 for purified water. In operation, wastewater enters the upper reactor chamber via delivery pipe 12 and is mixed with biomass. During a filtering mode, the wastewater then enters the porous hollow body 7 defining a membrane unit 6 and is filtered thereby. In an aerating mode, gas travels across the membrane in an opposite direction freeing the membrane of biomass lodged therein. A heat exchanger 16 can be provided for exchanging heat energy between the wastewater input and the purified water output. A control device for regulating gas flow, wastewater flow, and pH may also be provided including pressure, pH and oxygen content measurement. A channel 7a may be provided for adding a cleaning medium and also an absorbent reactor 13 for treating waste air.

17 Claims, 4 Drawing Sheets

AEROBIC MICROBIOLOGICAL WASTEWATER TREATMENT REACTOR

FIELD OF INVENTION

The invention relates to a device for aerobic microbiological treatment of waste water by producing a biodispersion.

BACKGROUND OF INVENTION

Aerobically living microorganisms have to be supplied with oxygen dissolved in water, so that they can convert and mineralise the "dirt sources" present in the waste water by respiration. When there is a rich supply of convertible water contents and adequately dissolved oxygen in the waste water, microbiological respiration takes place as so-called "multiplication respiration", wherein microorganisms multiply by division and therefore can breakdown the rich supply. When the supply is low, the microorganisms switch to "life-support respiration", in which only low conversion is carried out.

According to the state of the art, technologies are used which result in multiplication respiration, since high breakdown capacities should be achieved in the reactors. However, this multiplication respiration brings with it the main technological problem of waste water purification, which lies in the fact that considerable sewage sludge is produced which can only be disposed of very expensively.

SUMMARY OF THE INVENTION

The object of the invention is therefore to provide a device for aerobic microbiological treatment of waste water, in which only comparatively little sewage sludge is produced, wherein at the same time good efficiency is retained and purified water of good quality is achieved and wherein a simple construction of the device should be guaranteed, which can be adapted to different quantities of waste water.

This object is achieved according to the invention by the features of the independent claim.

Due to the fact that the device of the invention has a filter and aeration unit arranged in the lower part of the reactor, which consists of porous hollow bodies arranged one above another and serving as membranes, a bio-membrane reactor is made available, which reduces the sewage sludge problem in that the microorganisms are held back in the bio-membrane reactor by microfiltration and the respiration stress for the microorganisms resulting therefrom, caused by the fact that indeed sufficient oxygen is available, but the C source is not adequate, so that they have to be economical with the metabolism, leads to life-support respiration. Life-support respiration indeed causes a lower metabolism, but this is made up for again by the higher microbiological density, so that overall a breakdown capacity per $m^2$ of reactor is achieved as for multiplication respiration. The microorganisms and water contents penetrating into the pores of the porous membranes during microfiltration are rinsed out again during aeration, which takes place spasmodically, so that very long membrane service lives are possible. The porous hollow bodies, which in each case serve as a membrane, are used in both directions due to the alternating aeration and microfiltration process.

In addition to reducing the biomass, that is the sewage sludge, the waste water is treated by microfiltration, so that it satisfies the legal requirements for irrigation on site and for direct introduction, as a result of which decentralised waste water purification may be provided and the water cycle may be closed particularly in rural communities.

Specific and economic oxygen introduction is possible at any point over the cross-section due to the porous hollow bodies arranged one above another and serving as a membrane, the micropores of which are distributed uniformly over the cross-section of the reactor, so that there is no undersupply of oxygen and the microorganisms remain alive. After microfiltration, purified water is achieved of a quality which facilitates re-use in the production of non-drinkable water etc.

Advantageous further developments and improvements are possible due to the measures indicated in the sub-claims. It is particularly advantageous that when providing either several reactors or at least two filter and aeration units, which alternately aerate and filter, a continuous operation is possible.

The required preliminary pressure for microfiltration may be adjusted and the reactor residence time of the waste water determined by the control of the aeration process, but not by the signals of the oxygen measuring device and the pressure measuring device in the reactor collection chamber.

Exemplary embodiments of the invention are shown in the drawing and are illustrated in more detail in the following description.

DETAILED DESCRIPTION OF THE DRAWINGS

Figure 1:
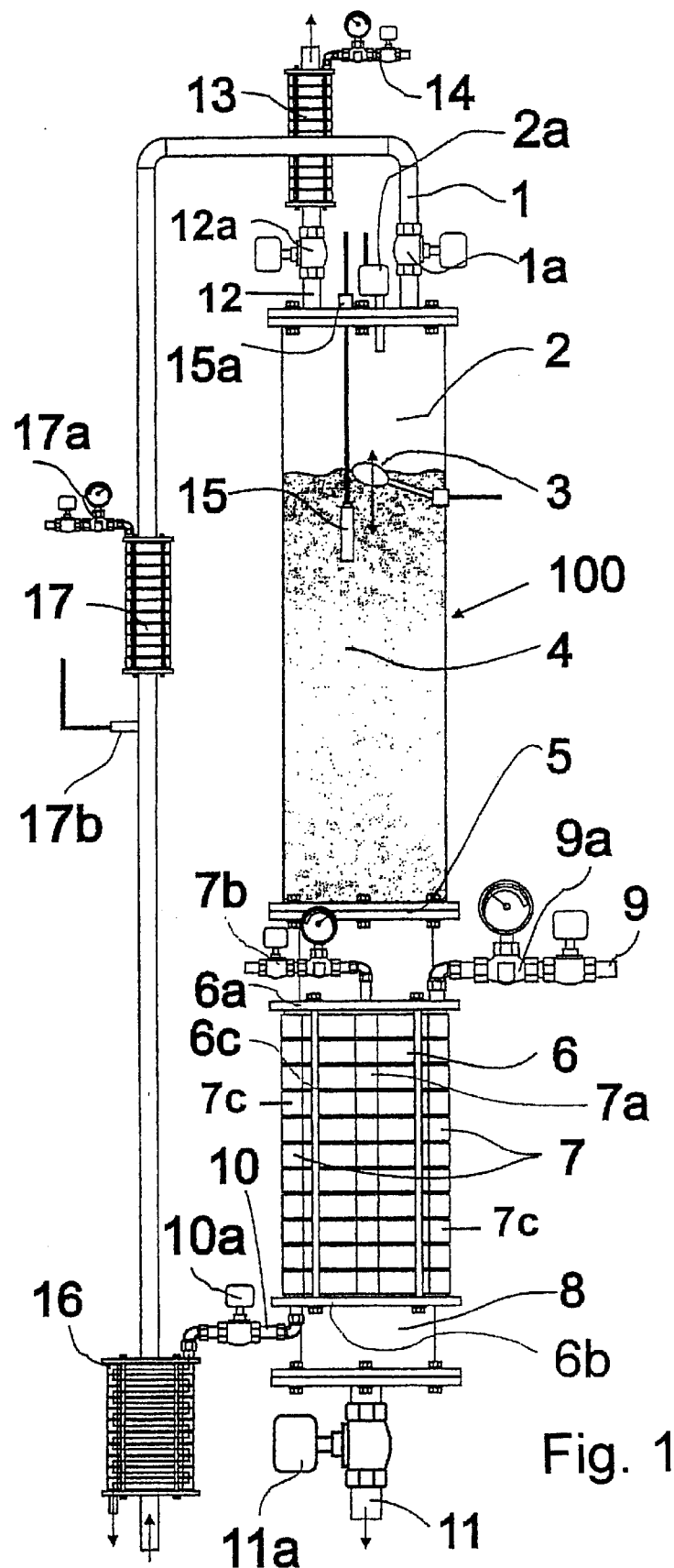
FIG. 1 shows the schematic structure of a device of the invention according to one exemplary embodiment of the invention.

The device shown in FIG. 1 for aerobic microbiological treatment of waste water has as essential constituent a reactor 100, which is connected to a waste water supply line 1, which emerges in the upper part of the reactor 100, which forms a collection chamber or reaction chamber 4. A filter and aeration or gassing unit 6 is connected to the collection chamber 4 via a first flange part 5 and via a second flange part 8 is surrounded on a reactor discharge pipe 11 which is controlled by a solenoid valve 11a, and which serves for discharge of material and for cleaning.

The filter and aeration unit 6 consists of individual hollow bodies 7 arranged in stacks above one another and which are designed like discs and which consist of porous material, preferably a porous ceramic material. The disc-like membrane parts or hollow bodies 7 are surrounded by two connection heads 6a, 6b, and are held together by pull rods 6c.

Figure 5:
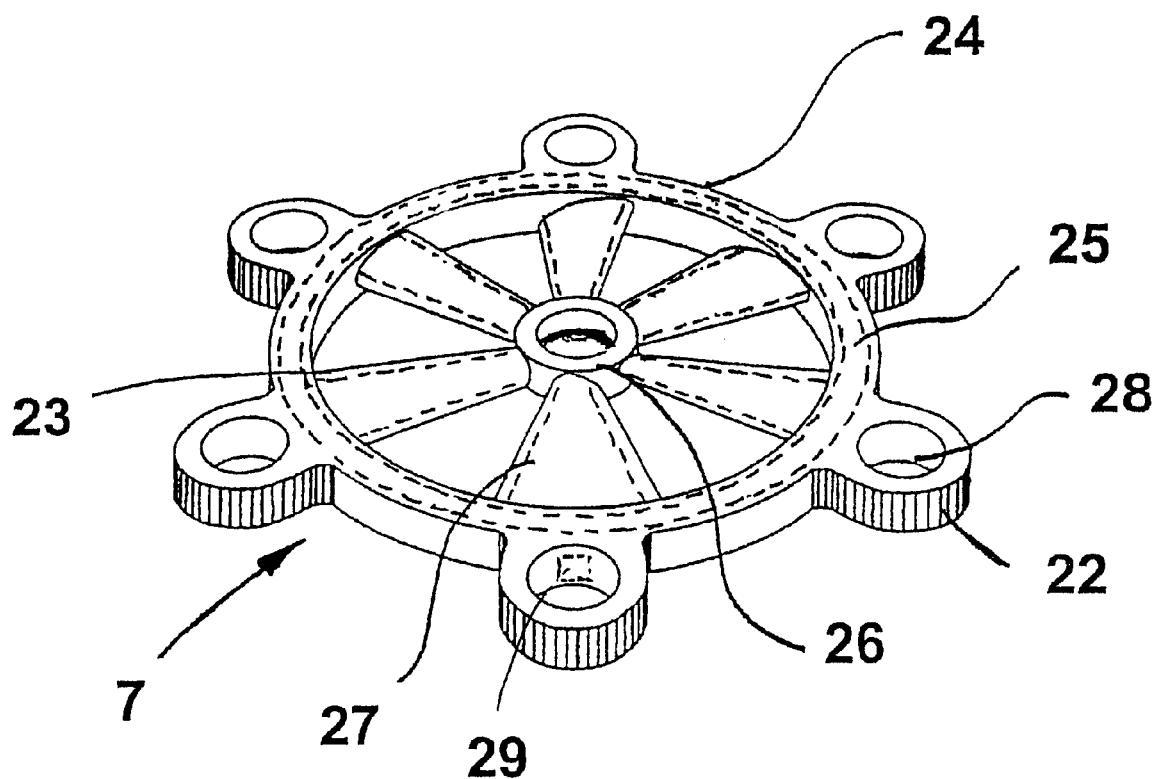
FIG. 5 shows a perspective view of an exemplary embodiment of a porous hollow body.

FIG. 5 shows an exemplary embodiment of a membrane part or hollow body 7, which can be used in the device according to FIG. 1. The hollow body consists of an outer ring 24, an inner ring 26, bars 27 arranged between inner ring 26 and outer ring 24 and attachments 22 having passage holes 28 moulded onto the outer ring 24. An outer ring channel 25, which is indicated by the dashed lines, is shaped in the outer ring 24. In the same manner, the bars 27 are designed to be hollow and have the bar channels 23 indicated by dashed lines. The openings 28 may be connected selectively to the outer ring channel 25 via regions 29 to be broken. The inner ring 26 may also have an inner ring channel. In the exemplary embodiment shown, the hollow body has a central passage opening, however, this need not be provided, for example a hollow connecting part may connect the bars 27 to one another. In the exemplary embodiment shown, six bars 27 and six attachments 22 are provided, but more or less of both may be formed. In FIG. 5, the hollow body is designed to be round, of course, it may also be rectangular and the passage holes 28 may be formed in the rectangular body. The bars may also have other shapes, but in principle, a uniform distribution should be provided over the cross-section.

The filter and aeration unit 6 shown in FIG. 1 consists of the membrane bodies 7 shown in FIG. 5, which are preferably arranged to be offset with respect to one another and above one another. Hence, they are offset with respect to one another so that at least one channel 7c formed by the passage openings 28 is produced, wherein two channels 7c are provided in FIG. 1. The one channel 7c is connected via the first flange part 5 to a compressed air or oxygen pipe 9, in which a solenoid valve 9a, which may be a constituent of a control fitting, is arranged, whereas the second channel 7c is connected to a discharge pipe 10 for purified water arranged on the second flange part 8 and in which likewise a solenoid valve 10a is arranged.

An oxygen probe 15 for measuring the oxygen content and a level control switch designed as a float 3 is provided in the collection or reactor chamber 4. Furthermore, a pressure sensor 2a for measuring the internal pressure in the reactor chamber 4 is provided.

To utilise the heat of the purified water emerging via the discharge pipe 10, a heat exchanger 16, which preferably likewise consists of hollow bodies corresponding to FIG. 5, but which are not porous, is provided in the waste water supply pipe 1, wherein the supply pipe 1 is connected to the flanges surrounding the hollow bodies and the waste water flows between the bars and wherein the purified water flows into the hollow cavities and releases its heat to the waste water.

Furthermore, a pH value sensor 17b for measuring the pH value of the waste water and a mixing device 17 having corresponding regulating and valve arrangements 17a is provided in or on the waste water supply pipe 1. The mixing device may also, as shown, consist of porous hollow bodies and be constructed in the same manner as the filter and aeration unit 6.

Finally, the reactor 100 is connected to a waste air pipe 12 having valves 12a, wherein an absorption reactor 13, which serves to remove smells, is arranged in the waste air pipe. Hence, the absorption reactor is connected to a supply pipe 14 for mains water. The absorption reactor 13 is also constructed like the filter and aeration unit 6, wherein the waste air flows between the bars of the porous hollow bodies and the water flows into the hollow cavities.

The filter and aeration unit 6, which consists of the porous ceramic hollow bodies 7, is sealed externally by a glaze or a sealing coating or the entire arrangement is accommodated in a sealing housing. Furthermore, the filter and aeration unit 6 may be designed with an additional cleaning channel 7a, which is connected to a pipe controlled via a valve 7b to supply cleaning agent.

To fill the reactor 100 with waste water, waste water is passed to the reactor chamber 4, in which biomass is situated which is mixed with the waste water, via the supply pipe 1 when valve 1a is open. For many industrial waste waters, it is necessary to check the pH value of the waste water and to neutralise it, optionally by addition of hydrochloric acid or sodium hydroxide solution. The pH value is measured via probe 17b and optionally via the control fitting 17a and the necessary liquid is metered into the reactor 17. During the filling phase, the valve 12a is also opened, so that the air displaced by the waste water may escape from the reaction chamber 4. During the filling process, the valves 9a, 10a and 11a are closed. The reaction chamber is filled with waste water until the float switch 3 switches off the waste water pump not shown, wherein a control device is provided for the corresponding control processes, which receives the signals from the various measuring devices and accordingly controls and/or regulates the valves or other control fittings. If the filling process is completed, the valve 1a preferably designed as a solenoid valve is likewise closed, so that only valve 12 is still open.

The waste air of the reactor chamber 4 is treated with aromatic substances and aerosols. So that they do not pass into the environment, the absorption reactor 13 is provided, which, as mentioned, consists of porous ceramic hollow chamber elements. Mains water, which forms, on the surface of the porous ceramic membranes, a film of water, on which the aromatic substances and aerosols are deposited, is supplied via the supply pipe 14. The charged water drops back into the reactor. During filling with waste water, while the waste air may escape via the waste air pipe 12, the corresponding valve of the supply pipe 14 for mains water is opened, so that the porous ceramic elements of the absorption reactor 13 are wetted with the ever-replenishing absorption liquid.

After filling the reactor chamber 4, the aeration process is initiated, wherein the valve 9a is opened and the channel 7c is connected to a compressed gas source, that is compressed air or oxygen. The compressed air is distributed spasmodically via the channel 7c on all membrane elements 7 and it escapes via the micropores of these elements, wherein the biomass deposited on the surface of the membrane elements 7 is blown away from the surface. The oxygen or the air is introduced uniformly, that is in uniform distribution over the cross-sectional surface of the reactor into the water surrounding the membrane elements 7 and rises upwards into the reactor chamber 4. The oxygen content is thus measured via the oxygen probe 15 and the oxygen or the air is supplied until a required oxygen value is reached.

The valve 12a is then closed, so that the air can no longer escape and an air cushion 2 is formed in the reactor interior 5. The internal pressure in the reactor chamber 4 is decisive for the filtration, wherein the membrane pore size of course plays a part which may be adapted to the parameters of the waste water to be filtered. The higher the preliminary pressure, that is the pressure in the reactor chamber 4, the greater the filtration capacity. If the pressure in the reactor interior 4, that is the pressure in the air cushion 2, reaches a certain value on the pressure sensor 2, the valve 9a is closed, so that no further air or oxygen passes into the filter and aeration unit 6.

The filter process now follows, in which the direction of action of the membrane bodies 7 is reversed to the aeration direction. For microfiltration, the valve 10a is opened and the pressure in the reactor is reduced over the hollow body 7 now acting as filter, wherein purified water passes into the heat exchanger 16 via the channel 7c and the pipe 10.

When pressure equalisation has taken place, the solenoid valve 10a is closed and the process starts from the beginning.

The discharge pipe 11 is used to empty the reactor, wherein the solenoid valve 11a is opened. This discharge 11 may also be used to clean the reactor, wherein cleaning agents, that is acid or lye, are introduced into the reactor and let out via the discharge 11. Steam, for example for sterilisation, may thus also be used. However, this cleaning process may also be integrated with the inflow channel 7a via the supply, wherein the connection fitting 7b is connected to the connection head 6a. The number of membrane or hollow body elements 7 depends on the ceramic membrane surface to be installed and its filtration and gassing or aeration capacity.

Figure 2:
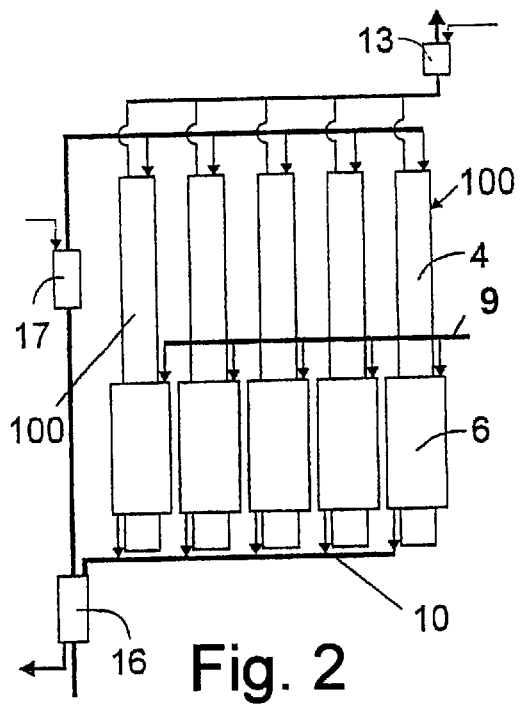
FIG. 2 shows the schematic representation of several reactors operating in parallel.

In FIG. 2 a plurality of reactors 100 are provided, which are arranged in parallel, but wherein the process states and the process course may in each case be different. The reactor chambers 4 are in each case connected to a waste water supply pipe 1 and a discharge pipe 10 for the purified water and to a supply pipe 9 for air or oxygen. Continuous operation may be realised due to this arrangement.

Figure 3:
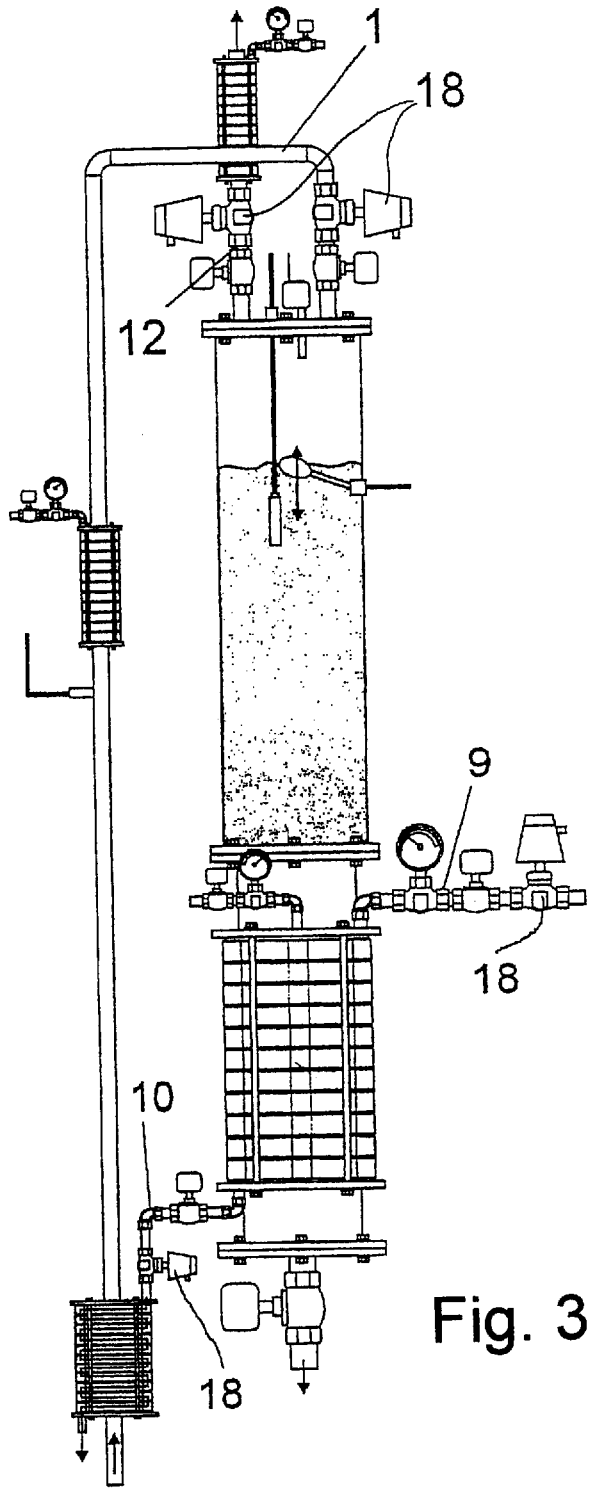
FIG. 3 shows a device corresponding to FIG. 1 with throughflow control fittings for continuous water-supply operation in excess pressure

FIG. 3 shows a reactor 100 or continuous water supply operation in excess pressure. Throughflow control fittings 18, which permit a mode of operation for the reactor in a certain pressure range, are installed here in the waste air pipe 12, in the discharge 10, in the waste water supply pipe 1 and in the compressed air pipe 9. This operation requires more expense in terms of control, but provides a higher capacity, since the oxygen saturation limit is raised with increasing water pressure, so that more oxygen is available to the microorganisms.

Figure 4:
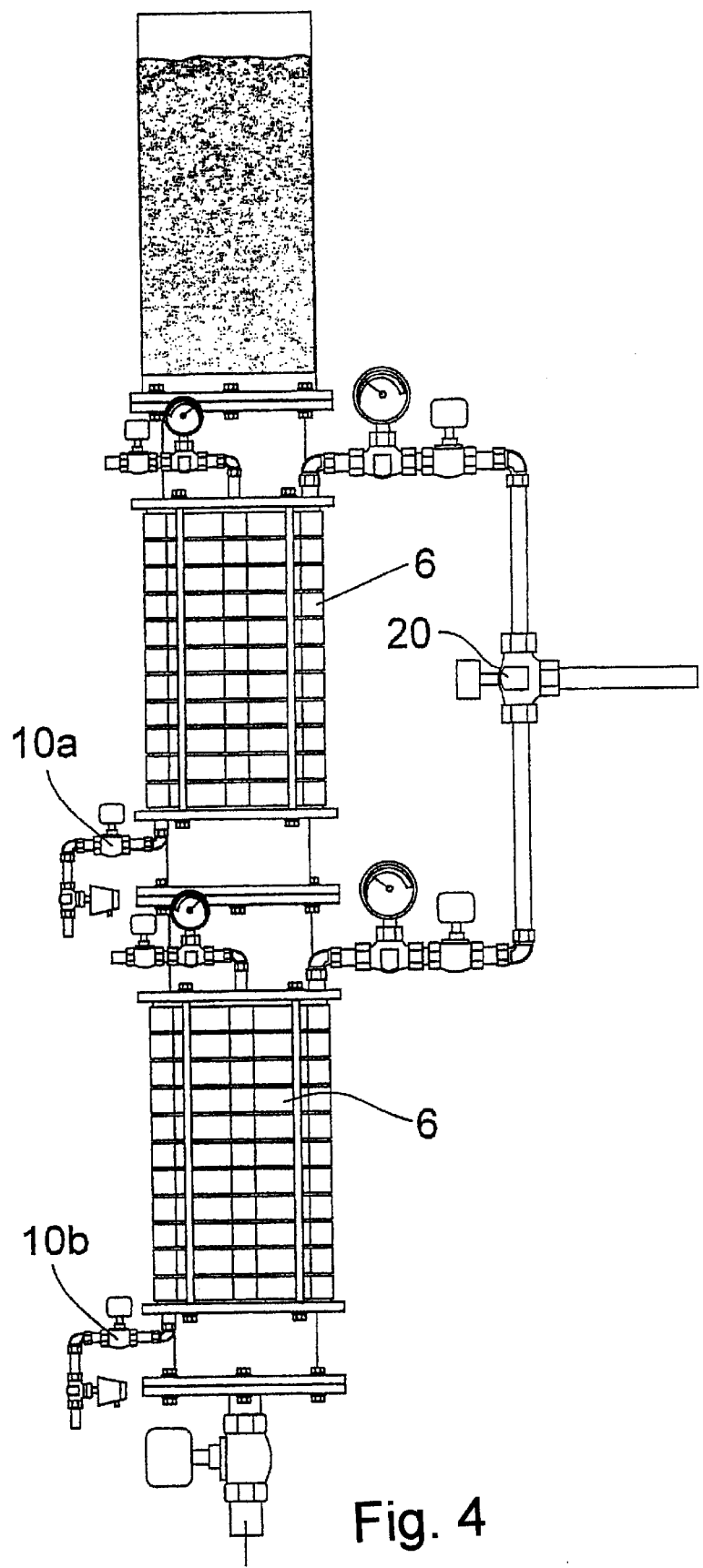
FIG. 4 shows a reactor having 2 filter and aeration units.

FIG. 4 shows 2 filter and aeration units 6, which in each case are switched over alternately between the aeration process and the filter process. Hence, a switch-over fitting 20, by means of which the compressed air is switched between the upper filter and aeration unit and the lower filter and aeration unit, is provided in the compressed air pipe 9. Here too, the reactor is operated continuously in excess pressure, wherein the membrane or hollow body elements of the corresponding unit are used once as aeration and then as microfiltration, if the corresponding solenoid valve 10a or 10b is opened, so that here too blockage of the membranes is minimised by back-aeration.

The ceramic mixing and contact surfaces of the hollow bodies may be coated with catalysts or enzymes without the porosity thus being lost. The enzymes are thus used to breakdown or crack protein materials in the waste waters. As an example of the catalysts, the introduction of hydrogen peroxide may be mentioned for the oxidation or reduction of hydrocarbons (also halogenated hydrocarbons) in the waste water using a catalytically active coating of the ceramic membrane on the inner side of the reactor with manganese oxide, in which oxygen and hydrogen radicals are formed.

Such a catalyst stage may also be placed upstream in the water supply, like the pH value control.

The device of the invention may also be used, for example as a mini-purifier for toilet installations or individual toilets on camping sites, buses, ships, aeroplanes, trains or the like. The device may thus additionally have a comminution pump for comminuting solids, wherein the hollow bodies may then have a central bore or an inner ring, so that a shaft drive may be installed.

What is claimed is:

1. A waste water treatment system for the aerobic microbiological treatment of waste water comprising:

(a) a reactor having an upper and a lower reactor chamber, said upper reactor chamber containing biomass; and
   (b) a filtering and aerating unit forming said lower reactor chamber and comprising an input port connected to a gas source, a discharge outlet for purified water, and at least one porous hollow body defining a membrane and including a hollow chamber communicating with said input port and said discharge outlet;
      wherein waste water to be purified is supplied via a waste water supply pipe to said upper reactor chamber and mixed with said biomass,
      and wherein in a filtering process, waste water then enters said filtering and aerating unit, travels across said membrane and exits as purified water via said hollow chamber and said discharge outlet; and in an aeration process, gas supplied to said input port enters said hollow chamber, travels across said membrane and flows into said upper reactor chamber.

2. A waste water treatment system according to claim 1, wherein the hollow body comprises at least one perforated, disc-shaped element.

3. A waste water treatment system according to claim 1, wherein said hollow body comprises several hollow bodies arranged one above another and the hollow chambers of the hollow bodies are connected to one another.

4. A waste water treatment system according to claim 3, wherein each hollow body has at least one passage hole, which is connected to the hollow chamber, wherein the passage holes of the hollow bodies are connected to one another and form at least one channel, which is in flow communication with at least one of the gas source and the discharge outlet.

5. A waste water treatment system according to claim 4, wherein each hollow body has an outer ring having an outer ring channel and a plurality of hollow bars each having a bar channel extending inwardly from the outer ring, wherein the hollow chambers are in flow communication with the bar channels and the outer ring channels via the passage holes.

6. A waste water treatment system according to claim 3, wherein inner and/or or outer surfaces of the hollow bodies are coated with enzymes and/or catalysts.

7. A waste water treatment system according of claim 1, wherein the gas source is a compressed gas source.

8. A waste water treatment system according to claim 1, further comprising a measuring device arranged in the upper reactor chamber for measuring oxygen content therein, and a valve for controlling the flow of gas from the gas source, wherein the time that the valve is opened is controlled in response to the measured oxygen content.

9. A waste water treatment system according to claim 1, further comprising a pressure measuring device, wherein a preliminary filtration pressure for the filtering and aerating unit is controlled in response thereto.

10. A waste water treatment system according to claim 1, wherein a heat exchanger is connected to a discharge pipe of the discharge outlet and to the waste water supply pipe.

11. A waste water treatment system according to claim 1, further comprising a waste air pipe connected to the upper reactor chamber and including an absorption reactor adapted to deposit aromatic substances and aerosols to said waste water.

12. A waste water treatment system according to claim 1, wherein the waste water supply pipe comprises a pH measuring device and a mixing device adapted to mix in materials for pH value regulation, depending on the measured pH.

13. A waste water treatment system according to claim 1, wherein the filtering and aerating unit has a cleaning channel for supplying a cleaning medium.

14. A waste water treatment system according to claim 1, wherein flow control devices are provided in at least one of the waste water supply pipe, a waste air pipe, a connecting pipe to the discharge outlet, and a connecting pipe to the gas source.

15. A waste water treatment system according to claim 1, wherein at least two filtering and aerating units are provided and further comprising a switch-over device adapted for switching over a supply of gas from one to the other filtering and aerating unit and vise versa, wherein the units alternately serve in the filtering process and in the aeration process.

16. A waste water treatment system according to claim 1, wherein a control and regulating device is provided, which controls and regulates at least one of flow through the waste water supply pipe, flow from the gas source, metering for pH regulation and residence times of the waste water in continuous or discontinuous operation, depending on measured values of measuring devices for measuring at least one of oxygen content, pressure and pH.

17. A waste water treatment system according to claim 1, wherein at least one of a heat exchanger, an absorption reactor, and a waste water supply pipe mixing device is provided and consists of hollow bodies, wherein the hollow bodies of the heat exchanger are not porous.

* * * * *